United States Patent
Lee et al.

(10) Patent No.: US 8,166,088 B2
(45) Date of Patent: Apr. 24, 2012

(54) FAST FOURIER TRANSFORM PROCESSOR

(75) Inventors: Hua-Han Lee, Taipei (TW); I-Hung Lin, Taipei (TW)

(73) Assignee: Via Technologies, Inc., Hsin-Tien, Taipei (TW)

( * ) Notice: Subject to any disclaimer, the term of this patent is extended or adjusted under 35 U.S.C. 154(b) by 1345 days.

(21) Appl. No.: 11/609,017

(22) Filed: Dec. 11, 2006

(65) Prior Publication Data

US 2007/0180011 A1 Aug. 2, 2007

(30) Foreign Application Priority Data

Jan. 9, 2006 (TW) .............................. 95100747 A

(51) Int. Cl.
*G06F 15/00* (2006.01)

(52) U.S. Cl. ...................................................... 708/404

(58) Field of Classification Search ........... 708/400–409
See application file for complete search history.

(56) References Cited

U.S. PATENT DOCUMENTS

| | | | | |
|---|---|---|---|---|
| 4,159,528 A * | 6/1979 | Perry | ............................. | 708/403 |
| 6,061,705 A * | 5/2000 | Hellberg | ....................... | 708/408 |
| 6,098,088 A * | 8/2000 | He et al. | ......................... | 708/406 |
| 6,122,703 A * | 9/2000 | Nasserbakht | .................. | 708/404 |
| 6,202,148 B1 * | 3/2001 | McCanny et al. | ................. | 713/1 |
| 6,366,936 B1 * | 4/2002 | Lee et al. | ........................ | 708/404 |
| 6,658,441 B1 * | 12/2003 | Kim | ................................. | 708/404 |
| 6,792,441 B2 * | 9/2004 | Jaber | .............................. | 708/403 |
| 7,577,698 B2 * | 8/2009 | Teng et al. | ..................... | 708/404 |
| 7,693,034 B2 * | 4/2010 | Singh et al. | .................... | 708/404 |
| 2001/0051967 A1 * | 12/2001 | Jaber | ............................. | 708/403 |
| 2004/0001557 A1 * | 1/2004 | Sunwoo | ........................ | 375/295 |
| 2005/0114421 A1 * | 5/2005 | Gibb et al. | .................... | 708/404 |
| 2005/0278405 A1 * | 12/2005 | Jaber | ............................. | 708/404 |
| 2006/0010188 A1 * | 1/2006 | Solomon et al. | .............. | 708/400 |
| 2008/0288569 A1 * | 11/2008 | Gibb et al. | .................... | 708/404 |

* cited by examiner

*Primary Examiner* — Tan V Mai
(74) *Attorney, Agent, or Firm* — Thomas|Kayden

(57) ABSTRACT

An implement method of a FFT processor comprises the following steps. First, a $2^1$ point FFT processor, which has an output and an input receiving a $2^{n+1}$ point data, is provided. A $2^n$-point FFT processor having an input and an output is provided. Sequentially, a multiplexer, which has a first input coupled to the output of the $2^1$ point FFT processor, a second input receiving a $2^n$ point data and an output coupled to the input of the $2^n$ point FFT processor, is provided. When an input data is a $2^n$ point data, the second input of multiplexer is coupled to the output thereof, and when an input data is a $2^{n+1}$ point data, the first input of multiplexer is coupled to the output thereof.

9 Claims, 6 Drawing Sheets

FAST FOURIER TRANSFORM PROCESSOR

BACKGROUND OF THE INVENTION

1. Field of the Invention

The invention relates to a fast Fourier transform (FFT) processor, and more particularly to a FFT processor capable of operating both a radix-$2^n$ algorithm and a radix-$2^{(n+1)}$ algorithm.

2. Description of the Related Art

In the wireless field, various modulation and demodulation methods are widely investigated for increasing the sensitivity and accuracy of the received radio frequency (RF) signal, wherein the orthogonal frequency division multiplexing (OFDM) shows the most potential. In OFDM, the modulation and the demodulation are respectively completed by IFFT (Inverse Fast Fourier Transform) and FFT, however, one FFT processor or IFFT processor can only operate one Fourier algorithm, for example, an FFT processor of an OFDM modulator for the UWB specification processes only one hundred and twenty eight point data.

When implementing FFT, many architecture types are used, such as radix-2, radix-4, radix-8, radix-$2^2$, radix-$2^3$ and so on, wherein radix-$2^2$, radix-$2^3$ architectures are widely applied in integrated circuits due to decreasing the number of complex number multipliers. A complex number multiplier is implemented by one adder and two multipliers in circuit design, and if the complex number multipliers decrease, the layout area of the FFT processor decreases.

The architecture of radix-$2^2$ can process the data with all $4^n$ point data, such as 1, 4, 16, 64 point data and so on, and the architecture of radix radix-$2^3$ can process the data with all $8^n$ point data, such as 1, 8, 64, 512 point data and so on. However, if the data is neither $4^n$ point data nor $8^n$ point data, such as 128 or 2048 point data, the architecture of radix-2 may be applied, thus, the number of complex number multipliers increases and the layout area of the FFT circuit increases.

Furthermore, the conventional OFDM processor is suited for only one wireless specification, and if a RF receiver is designed to process different wireless specification data, different OFDM processors are required, thus, the cost and the layout area of the receiver increase.

BRIEF SUMMARY OF THE INVENTION

The invention provides a processor for implementing fast Fourier transform, comprising a fast Fourier transform processor unit operating a radix-$2^n$ algorithm, a first butterfly-I unit operating a radix-2 algorithm, a coefficient generator, a multiplexer, and a bit-reverse circuit. The fast Fourier transform processor unit having a data input terminal and a data output terminal comprises at least one butterfly-III unit operating a radix-$2^3$ algorithm, and a second butterfly-I unit operating a radix-2 algorithm. Each butterfly-III unit is coupled to another butterfly-III unit by a complex number multiplier. The second butterfly-I unit coupled to one butterfly-III unit by a first complex number multiplier, has a data input terminal receiving $2^n$ points data, and a data output terminal. The first butterfly-I unit has a data input terminal receiving $2^{(n+1)}$ point data, and a data output terminal. The coefficient generator generates and transmits a plurality of twiddle factors to the corresponding multipliers and complex number multipliers. The multiplexer has a control terminal, an output terminal and two input terminals, wherein one input terminal is coupled to the output of the first butterfly-I unit, another input terminal receives $2^n$ point data, the output terminal is coupled to the input of the fast Fourier transform processor unit, and the control terminal switches one of the two input terminals coupled to the output terminal based on a control signal. The bit-reverse circuit is coupled to the output of the fast Fourier transform processor unit to rearrange the output data of the fast Fourier transform processor unit.

The invention provides an OFDM demodulator suited for UWB and WiMAX specifications, comprising an analog front end, a first serial-parallel conversion circuit, a FFT processor, a second serial-parallel conversion circuit, and a demapping unit. The analog front end receives and analog filters a RF signal, and then amplifies and converts the filtered RF signal to a digital serial signal. The first serial-parallel conversion circuit receives and converts the serial signal to a first parallel signal. The FFT processor applies a fast Fourier transform on the first parallel signal to output a second parallel signal. The second serial-parallel conversion circuit receives and converts the second parallel signal to a third signal. The demapping unit receives and demaps the third signal to an output signal. The FFT processor further comprises a first butterfly-I unit operating a radix-2 algorithm, a second butterfly-I unit operating a radix-2 algorithm, a first butterfly-III unit, a second butterfly-III unit, a multiplexer, and a bit-reverse circuit. The first butterfly-I unit has a 128 word feedback register coupled between a feedback input and a feedback output thereof, a input terminal receiving a 256 point data and a output terminal. The multiplexer has a first input terminal, a second input terminal first output terminal and a control terminal, wherein the first input terminal is coupled to the output terminal of the first butterfly-I unit, and the second input terminal receives a 128 point data, wherein when the first parallel signal is the 256 point data, the control terminal makes a connection between the first input terminal and the first output terminal, and when the first parallel signal is the one hundred and twenty eight point data, the control terminal makes a connection between the second input terminal and the first output terminal. The second butterfly-I unit has a sixty four word feedback register coupled between a feedback input and a feedback output thereof, a second input terminal coupled to the first output terminal, and a second output terminal coupled to a first complex number multiplier receiving a first twiddle factor to complete a first complex number multiplication. The first butterfly-III unit has a third input terminal coupled to the second output terminal of the second butterfly-I unit via the first complex number multiplier, receiving and operating a radix-$2^3$ algorithm based on the first complex number multiplication, and a third output terminal coupled to a second complex number multiplier receiving a second twiddle factor to complete a second complex number multiplication. The second butterfly-III unit has a fourth input terminal coupled to the second output terminal of the first butterfly-III unit via the second complex number multiplier, receiving and operating a radix-$2^3$ algorithm based on the second complex number multiplication, and a fourth output terminal outputting a second signal. The bit-reverse circuit receives and converts the second signal to the second parallel signal.

The invention provides a method of implementing an FFT processor comprising the steps of: providing a $2^1$ point FFT processor having an output and an input receiving a $2^{n+1}$ point data; providing a $2^n$ point FFT processor having an input and an output; providing a multiplexer having a first input coupled to the output of the $2^1$ point FFT processor, a second input receiving a $2^n$ point data and an output coupled to the input of the $2^n$ point FFT processor; when a input data is a $2^n$ point data, the second input of multiplexer being coupled to the output thereof, and when a input data is a $2^{n+1}$ point data, the first input of multiplexer being coupled to the output thereof.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
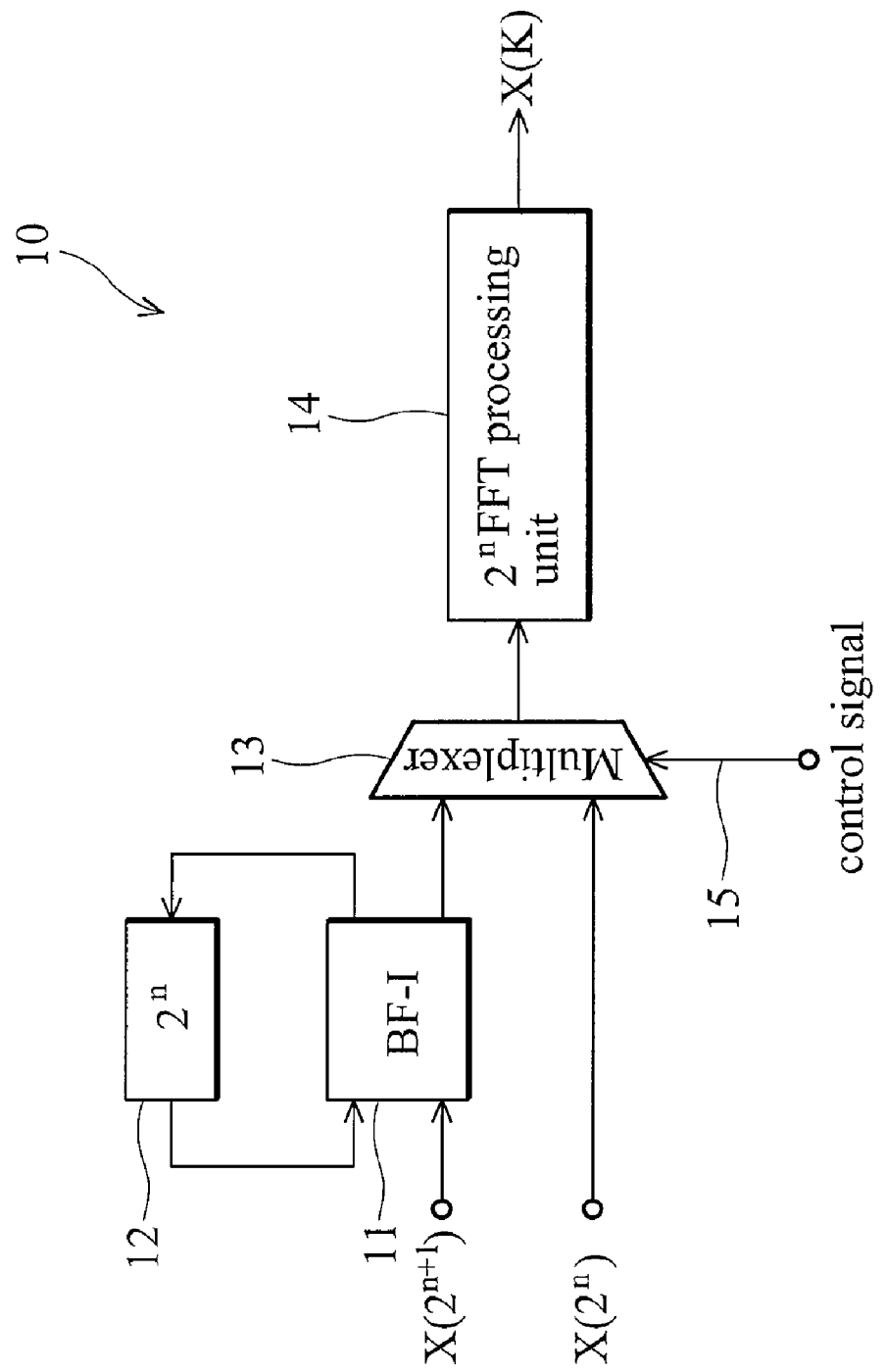
FIG. 1 is a block diagram of an embodiment of an FFT processor capable of processing $2^n$ point data and $2^{(n+1)}$ point data of the invention.

To solve the issue of cost and layout area for an RF signal receiver capable of processing different wireless specification data, the invention provides FFT architecture capable of operating different Fourier algorithms. FIG. 1 is a block diagram of an embodiment of a FFT processor capable of processing $2^n$ point data and $2^{(n+1)}$ point data of the invention. The FFT processor 10 comprises a $2^n$ point FFT processor 14, a butterfly-I unit 11, and a multiplexer 13 for switching the operations of the 2.sup.n point FFT processor 14 and the butterfly-I unit 11. The butterfly-I unit 11 operates a radix-2 FFT algorithm and has a $2^n$ word register 12 for storing the data of the radix-2 algorithm. When the FFT processor 10 receives a $2^{n+1}$ point data X ($2^{n+1}$), the $2^{n+1}$ point data is processed first by a radix-2 algorithm in the butterfly-I unit 11, and the operation result is then transmitted to a multiplexer 13. The multiplexer 13 receives and transmits the data X ($2^{n+1}$) or X ($2^n$) according to a control signal to the $2^n$ point FFT processor 14 for the output data X (k).

In FIG. 1, the $2^n$ point FFT processor 14 comprises one or a plurality of butterfly-I units, such as the butterfly-I unit 11, one or a plurality of butterfly-II units operating a radix-$2^2$ algorithm, one or a plurality of butterfly-III units or any of the processing units operating a fast Fourier transform.

Figure 2:
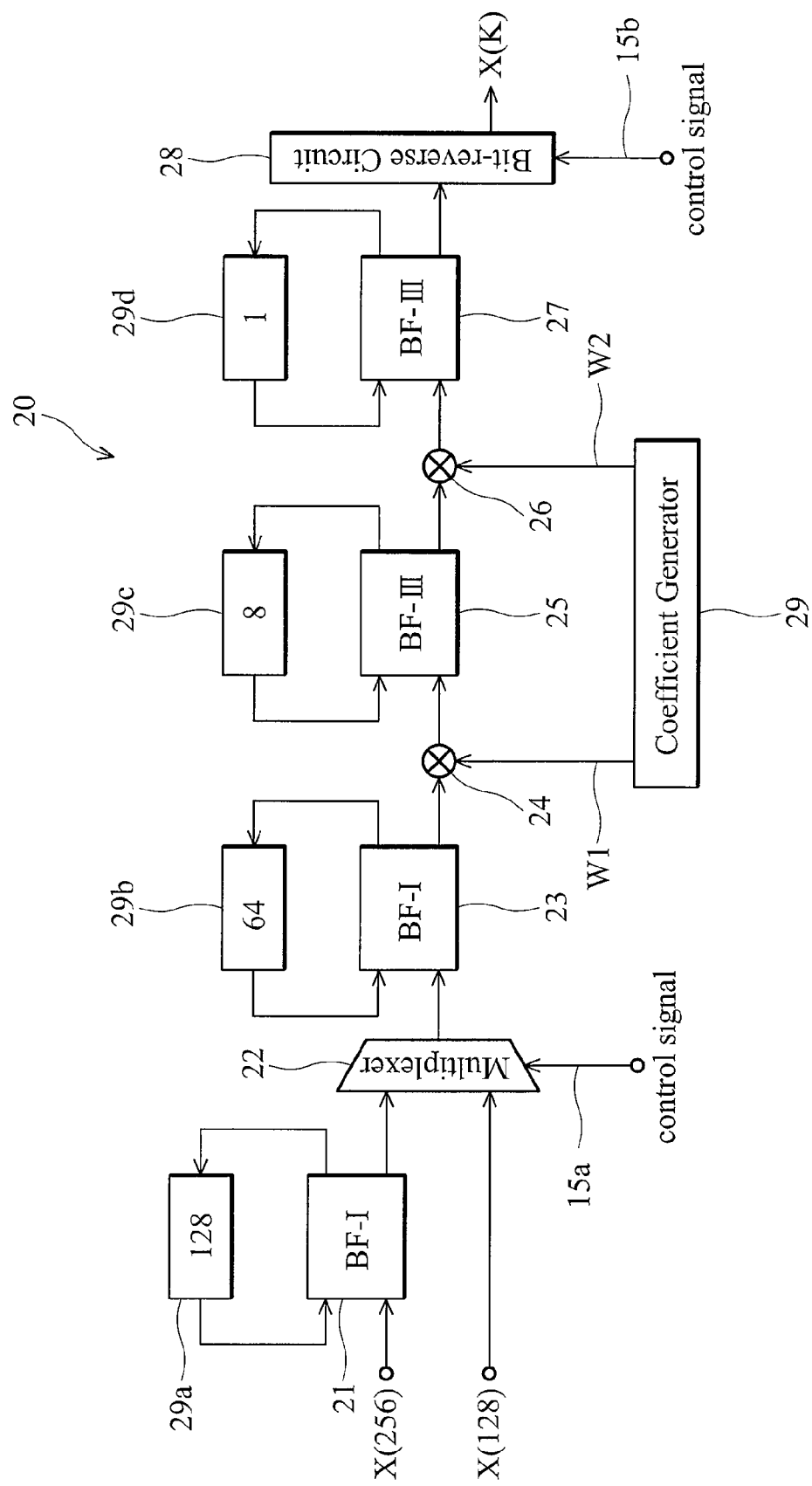
FIG. 2 is a schematic diagram of an embodiment of an FFT processor capable of processing 256-point data and 128-point data.

The invention further provides a FFT processor capable of processing the UWB (IEEE 802.15) data and the WiMAX (IEEE 802.16) data. Since the UWB data is a 256-point data and the WiMAX data is a 128-point data, the FFT processor should be capable of processing 256-point data and 128-point data. Turning first to FIG. 2 that is a schematic diagram of one embodiment of an FFT processor 20 capable of processing 256-point data and 128-point data. A butterfly-I unit 21 receives and applies a radix-2 FFT algorithm on a 256-point data X (256), and then outputs the operation result to a multiplexer 22. The butterfly-I unit 21 has a 128-word register 29a for storing the data of the radix-2 algorithm. The multiplexer 22 can select a 128-point data X (128) or the data outputted from the butterfly-I unit 21 to output a specific data according to a control signal 15a. Thus, the FFT processor 20 can process both WiMAX point data and UWB point data by switching the multiplexer 22.

An output terminal of the multiplexer 22 is coupled to the input terminal of the butterfly-I unit 21. The butterfly-I unit 21 receives and applies a radix-2 FFT algorithm on a 128-point data from the output terminal of the multiplexer 22. The butterfly-I unit 22 comprises a 64-word register 29b for storing the data of the radix-2 algorithm. A complex number multiplier 24 coupled to the output terminal of the butterfly-I unit 21 operates a complex number multiplication with a factor W1 from a coefficient generator 29. The butterfly-III unit 25 receives and applies a radix-$2^3$ algorithm on the multiplication result of the complex number multiplier 24. The butterfly-III unit 25 comprises an 8-word register for storing the data of the radix-$2^3$ algorithm. A complex number multiplier 26 receives the data outputted by the butterfly-III unit 25 and a factor W2 from a coefficient generator 29, and operates a complex number multiplication. The butterfly-III unit 27 receives and applies a radix-$2^3$ algorithm on the multiplication result of the complex number multiplier 26. A bit-reverse circuit 28 activated by a control signal 15b rearranges the data from the butterfly-III unit 27 to output sequential data X (k).

Figure 3:
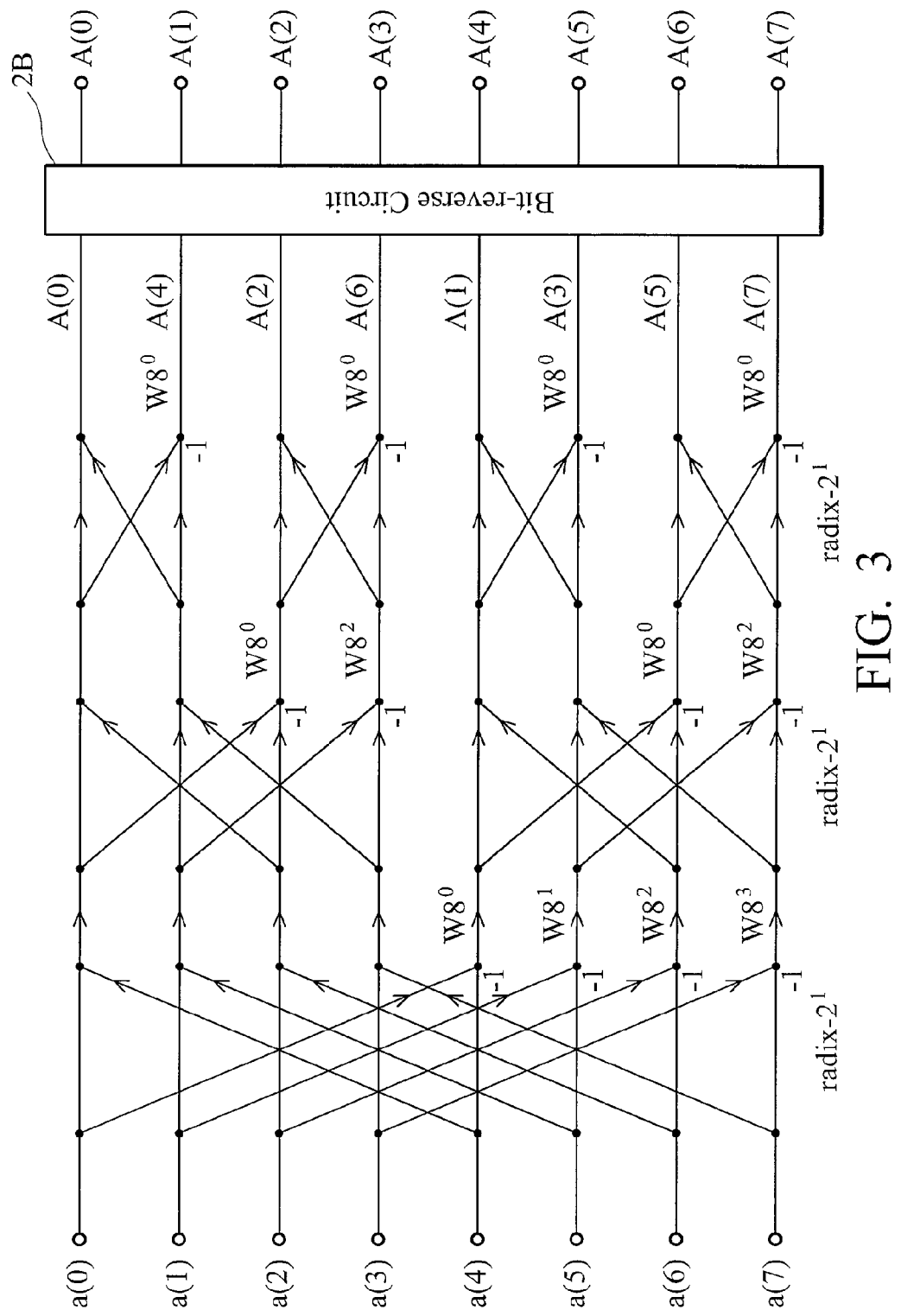
FIG. 3 is a schematic diagram of an 8-point data processed by a radix-$2^3$ algorithm.

To further illustrate the operation of the bit-reverse circuit 28, please refer to FIG. 3. FIG. 3 is a schematic diagram of an 8-point data processed by a radix-$2^3$ algorithm. At the beginning, the 8-point data is shown in the form of eight points that is sequentially arranged as a (0) to a (7). After processing by a radix-$2^3$ algorithm, the eight points are arranged as [A(0), A(4), A(2), A(6), A(1), A(3), A(5), A(7)]. Therefore, it is necessary that the bit-reverse circuit 28 rearranges and outputs the processed data that is shown in the form of eight points as A (0) to A (7). The corresponding signal is easily determined in hardware design.

Figure 4:
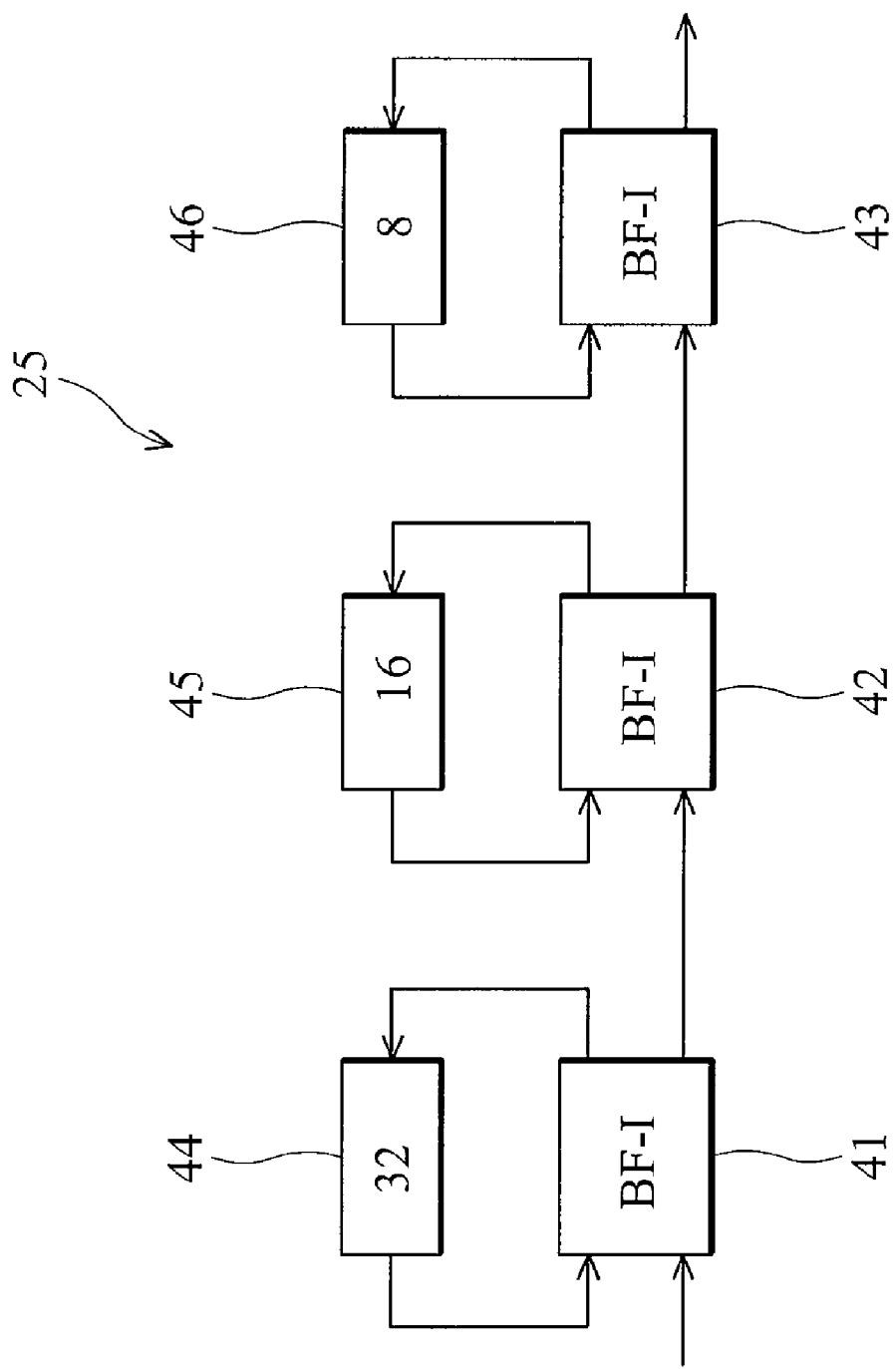
FIG. 4 is a schematic diagram of an embodiment of the butterfly-III unit 25 of FIG. 2 of the invention.

FIG. 4 is a schematic diagram of an embodiment of the butterfly-E unit 25 of FIG. 2 of the invention. The butterfly-III unit 25 comprises a butterfly-I unit 41, a butterfly-I unit 42, and a butterfly-I unit 43. The butterfly-I unit 41 receives and applies a radix-2 algorithm on the data from the complex number multiplier 24. The butterfly-I unit 41 comprises a 32-word register for storing the data of the radix-2 algorithm. The butterfly-I unit 42 receives and applies a radix-2 algorithm on the data from the butterfly-I unit 41. The butterfly-I unit 42 comprises a 16-word register for storing the data of the radix-2 algorithm. The butterfly-I unit 43 receives and applies a radix-2 algorithm on the data from the butterfly-I unit 42. The butterfly-I unit 43 comprises an 8-word register for storing the data of the radix-2 algorithm.

Figure 5:
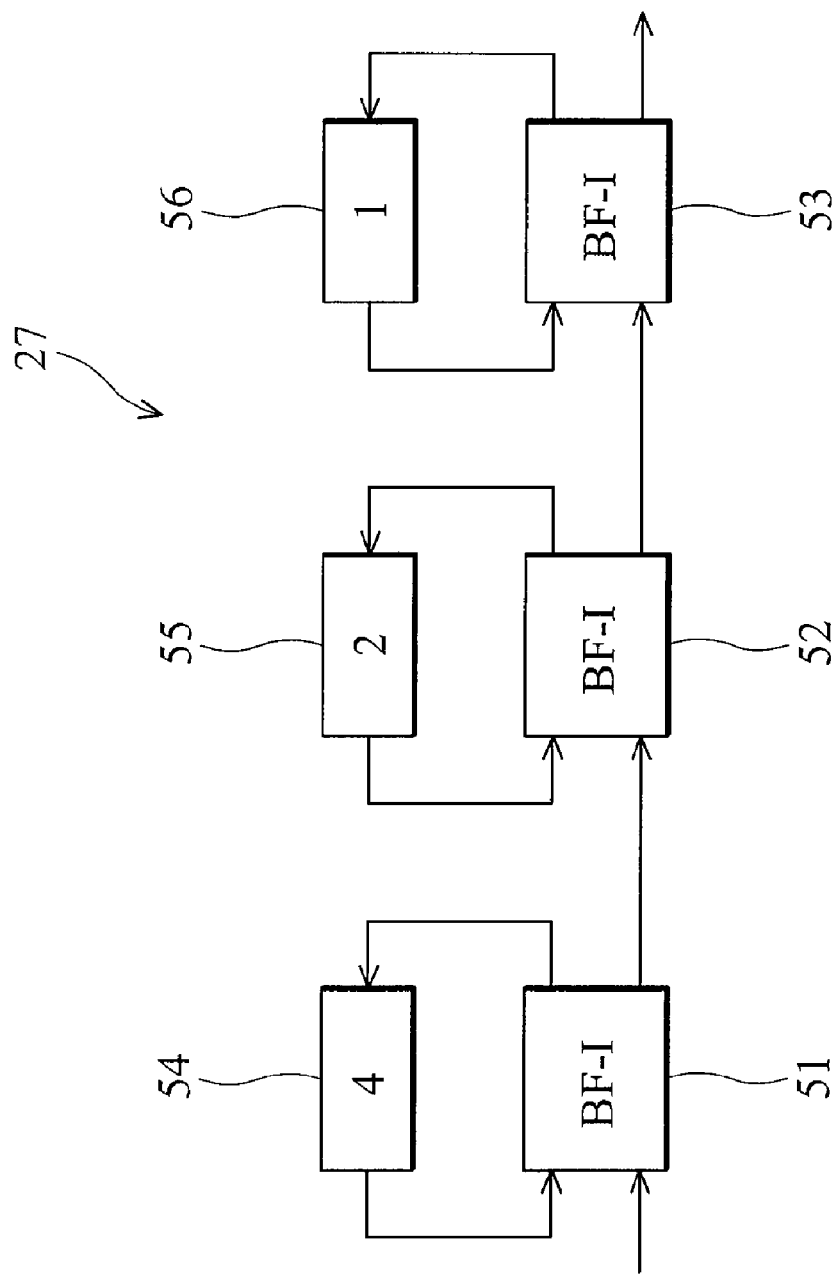
FIG. 5 is a schematic diagram of an embodiment of the butterfly-III unit 27 of FIG. 2 of the invention.

FIG. 5 is a schematic diagram of an embodiment of the butterfly-III unit 27 of FIG. 2 of the invention. The butterfly-III unit 27 comprises a butterfly-I unit 51, a butterfly-I unit 52, and a butterfly-I unit 53. The butterfly-I unit 51 receives and applies a radix-2 algorithm on the data from the complex number multiplier 26. The butterfly-I unit 51 comprises a 4-word register for storing the data of the radix-2 algorithm. The butterfly-I unit 52 receives and applies a radix-2 algorithm on the data from the butterfly-I unit 51. The butterfly-I unit 52 comprises a 2-word register for storing the data of the radix-2 algorithm. The butterfly-I unit 53 receives and applies a radix-2 algorithm on the data from the butterfly-I unit 52. The butterfly-I unit 53 comprises a 1-word register for storing the data of the radix-2 algorithm.

Figure 6:
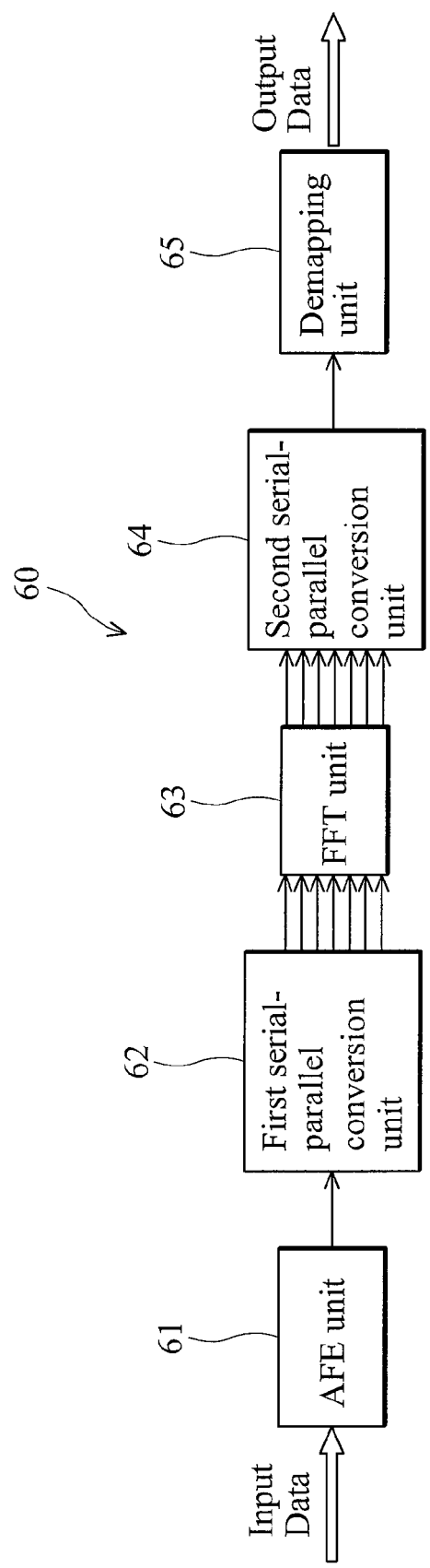
FIG. 6 is a schematic diagram of an embodiment of an OFDM processor using the FFT processor of FIG. 2 of the invention.

FIG. 6 is a schematic diagram of an embodiment of an OFDM processor using the FFT processor of FIG. 2 of the invention. The OFDM processor of FIG. 6 processes both the UWB data and the WiMAX data. An analog front end (AFE) 61 receives and analogically filters a received RF signal, and then amplifies and converts the filtered RF signal to a digital serial signal. A first serial-parallel conversion circuit 62 receives and converts the serial signal from the AFE 61 to a parallel signal. An FFT processor 63 receives and determines the type of the received parallel signal, then, the FFT processor 63 operates a corresponding FFT algorithm, wherein a different FFT algorithm is determined by switching a multiplexer, such as the multiplexer 22. According to the described operation, the OFDM processor of FIG. 6 can correctly process the UWB data and the WiMAX data. A second serial-parallel conversion circuit 64 then receives and converts the data from the FFT processor 63 to a parallel signal. A demapping unit then receives and demaps the parallel signal from the second serial-parallel conversion circuit 64.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A processor for implementing fast Fourier transform, comprising:
   a fast Fourier transform (FFT) processor unit for operating a radix-$2^7$ algorithm, comprising:
   a first butterfly-III unit for operating a radix-$2^3$ algorithm;
   a second butterfly-III unit serial coupled to the first butterfly-III unit by a second complex number multiplier, for operating a radix-$2^3$ algorithm; and
   a second butterfly-I unit, which is coupled to the first butterfly-III units via a first complex number multiplier, for receiving $2^7$ point data and operating a radix-2 algorithm;
   a first butterfly-I unit, for receiving $2^8$ point data and operating a radix-2 algorithm;
   a coefficient generator for generating and transmitting a plurality of twiddle factors to the first and second complex number multipliers;
   a multiplexer having a control terminal, a output terminal and two input terminals, wherein one input terminal is coupled to the output of the first butterfly-I unit, another input terminal receives $2^7$ point data, the output terminal is coupled to the input of the second butterfly-I unit, and the control terminal switches one of the two input terminals coupled to the output terminal based on a control signal; and
   a bit-reverse circuit, which is coupled to the output of the second butterfly-III unit, for rearranging the output data of the first fast Fourier transform processor;
   wherein:
   each of the first and second butterfly-I units has a feedback path formed between of a feedback input and a feedback output thereof;
   the first butterfly-I unit has a 128-word feedback register coupled between the feedback input and the feedback output thereof; and
   the second butterfly-I unit has a 64-word feedback register coupled between the feedback input and the feedback output thereof.

2. The processor as claimed in claim 1, wherein the first butterfly-III unit comprises a third butterfly-I unit, a fourth butterfly-I unit and a fifth butterfly-I unit, wherein each of the first, second, third, fourth, fifth butterfly-I units has a feedback path formed between of a feedback input and a feedback output thereof.

3. The processor as claimed in claim 2, wherein an input of the third butterfly-I unit is coupled to the first complex number multiplier, an output of the third butterfly-I unit is coupled to an input of the fourth butterfly-I unit, an output of the fourth butterfly-I unit is coupled to an input of the fifth butterfly-I unit, and an output of the fifth butterfly-I unit is coupled to the second butterfly-III unit.

4. The processor as claimed in claim 2, wherein the second butterfly-III unit comprises a sixth butterfly-I unit, a seventh butterfly-I unit and a eighth butterfly-I unit, wherein each of the first, second, third, fourth, fifth, sixth, seventh, eighth butterfly-I units has a feedback path formed between of a feedback input and a feedback output thereof.

5. The processor as claimed in claim 4, wherein an input of the sixth butterfly-I unit is coupled to the output of the fifth butterfly-I unit, an output of the sixth butterfly-I unit is coupled to an input of the seventh butterfly-I unit, an output of the seventh butterfly-I unit is coupled to an input of the eighth butterfly-I unit, and an output of the eighth butterfly-I unit is coupled to the bit-reverse circuit.

6. The processor as claimed in claim 4, wherein:
   third butterfly-I unit has a 32-word feedback register coupled between the feedback input and the feedback output thereof;
   the fourth butterfly-I unit has a 16-word feedback register coupled between the feedback input and the feedback output thereof;
   the fifth butterfly-I unit has an 8-word feedback register coupled between the feedback input and the feedback output thereof;
   the sixth butterfly-I unit has a 4-word feedback register coupled between the feedback input and the feedback output thereof;
   the seventh butterfly-I unit has a 2-word feedback register coupled between the feedback input and the feedback output thereof; and
   the eight butterfly-I unit has a 1-word feedback register coupled between the feedback input and the feedback output thereof.

7. An OFDM (Orthogonal Frequency Division Multiplexing) demodulator suited for UWB (UltraWideband) and WiMAX (Worldwide Interoperability for Microwave Access) specifications, comprising:
   an analog front end, which receives and analogically filters a RF signal, for amplifying and converting the RF signal to a digital serial signal;
   a first serial-parallel conversion circuit for receiving and converting the serial signal to output a first parallel signal;
   a FFT processor applying a fast Fourier transform on the first parallel signal to output a second parallel signal, comprising:
   a first butterfly-I unit, which has a 128-word feedback register coupled between a feedback input and a feedback output thereof, and a input terminal for receiving a 256-point data and a output terminal, for operating a radix-2 algorithm;
   a multiplexer for having a first input terminal, a second input terminal first output terminal and a control terminal, wherein the first input terminal is coupled to the output terminal of the first butterfly-I unit, and the second input terminal receives a 128-point data, wherein when the first parallel signal is the 256-point data, the control terminal makes a connection between the first input terminal and the first output terminal, and when the first parallel signal is the 128-point data, the control terminal makes a connection between the second input terminal and the first output terminal;

a second butterfly-I unit, which operates a radix-2 algorithm, for having a 64-word feedback register coupled between a feedback input and a feedback output thereof, a second input terminal coupled to the first output terminal, and a second output terminal coupled to a first complex number multiplier receiving a first twiddle factor to complete a first complex number multiplication;

a first butterfly-III unit, which has a third input terminal coupled to the second output terminal of the second butterfly-I unit via the first complex number multiplier and a third output terminal coupled to a second complex number multiplier receiving a second twiddle factor to complete a second complex number multiplication, for receiving and operating a radix-$2^3$ algorithm based on the first complex number multiplication;

a second butterfly-III unit, which has a fourth input terminal coupled to the second output terminal of the first butterfly-III unit via the second complex number multiplier and a fourth output terminal outputting a second signal, for receiving and operating a radix-$2^3$ algorithm based on the second complex number multiplication; and a bit-reverse circuit for receiving and converting the second signal to the second parallel signal;

a second serial-parallel conversion circuit for receiving and converting the second parallel signal to a third signal; and a demapping unit for receiving and demapping the third signal to output an output signal.

8. The demodulator as claimed in claim 7, wherein the first butterfly-III unit comprises:

a third butterfly-I unit for having a 32-word feedback register coupled between a feedback input and a feedback output thereof, a fifth input terminal coupled to the third input terminal, and a fifth output terminal;

a fourth butterfly-I unit for having a 16-word feedback register coupled between a feedback input and a feedback output thereof, a sixth input terminal coupled to the fifth output terminal, and a sixth output terminal; and a fifth butterfly-I unit for having an 8-word feedback register coupled between a feedback input and a feedback output thereof, a seventh input terminal coupled to the sixth output terminal, and a seventh output terminal coupled to the third output terminal.

9. The demodulator as claimed in claim 7, wherein the first butterfly-III unit comprises:

a sixth butterfly-I unit for having a 4-word feedback register coupled between the feedback input and the feedback output thereof, a eighth input terminal coupled to the fourth input terminal, and a eighth output terminal;

a seventh butterfly-I unit for having a two word feedback register coupled between the feedback input and the feedback output thereof, a ninth input terminal coupled to the eighth output terminal, and a ninth output terminal; and a eight butterfly-I unit for having a one word feedback register coupled between the feedback input and the feedback output thereof, a tenth input terminal coupled to the ninth output terminal, and a tenth output terminal coupled to the fourth output terminal.

* * * * *